United States Patent
Yang et al.

(10) Patent No.: US 8,424,192 B1
(45) Date of Patent: Apr. 23, 2013

(54) METHOD FOR MANUFACTURING A POLE FOR A MAGNETIC RECORDING HEAD

(75) Inventors: Danning Yang, Fremont, CA (US); Lei Wang, Fremont, CA (US); Yingjian Chen, Fremont, CA (US); Brant Nease, Fremont, CA (US); Kyusik Sin, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 2073 days.

(21) Appl. No.: 11/199,281

(22) Filed: Aug. 8, 2005

(51) Int. Cl.
*G11B 5/127* (2006.01)
*H04R 31/00* (2006.01)

(52) U.S. Cl.
USPC .............. 29/603.16; 29/603.12; 29/603.13; 29/603.14; 29/603.15; 29/603.18; 216/62; 216/65; 216/66; 360/121; 360/122; 360/317; 451/5; 451/41

(58) Field of Classification Search .. 29/603.13–603.16, 29/603.18; 216/65; 360/121, 122, 317; 451/5, 451/41
See application file for complete search history.

(56) References Cited

U.S. PATENT DOCUMENTS

| | | | |
|---|---|---|---|
| 4,130,847 A | 12/1978 | Head et al. | |
| 4,425,701 A | 1/1984 | Takahashi et al. | |
| 5,242,566 A | 9/1993 | Parker | |
| 5,320,728 A | 6/1994 | Tepman | |
| 5,512,150 A | 4/1996 | Bourez et al. | |
| 5,874,010 A * | 2/1999 | Tao et al. | 216/22 |
| 5,916,423 A | 6/1999 | Westwood | |
| 5,985,104 A | 11/1999 | Westwood | |
| 6,072,672 A | 6/2000 | Westwood | |
| 6,106,679 A | 8/2000 | Westwood | |
| 6,353,995 B1 * | 3/2002 | Sasaki et al. | 29/603.14 |
| 6,410,170 B1 | 6/2002 | Chen et al. | |
| 6,500,351 B1 | 12/2002 | Wu et al. | |
| 6,682,637 B2 | 1/2004 | Heinz et al. | |
| 6,685,845 B2 | 2/2004 | Wu et al. | |
| 6,776,917 B2 | 8/2004 | Hsiao et al. | |
| 6,783,638 B2 | 8/2004 | Clarke | |
| 6,800,178 B2 | 10/2004 | Westwood | |
| 6,848,166 B2 | 2/2005 | Lee | |
| 6,862,798 B2 | 3/2005 | Kruger et al. | |
| 2005/0068665 A1 * | 3/2005 | Le et al. | 360/97.01 |

* cited by examiner

Primary Examiner — Paul D Kim

(57) ABSTRACT

A method and system for manufacturing a pole on a recording head is disclosed. The method and system include sputtering at least one ferromagnetic layer and fabricating a hard mask on the ferromagnetic layer. The method and system also include defining the pole and depositing a write gap on the pole. A portion of the pole is encapsulated in an insulator.

14 Claims, 10 Drawing Sheets

METHOD FOR MANUFACTURING A POLE FOR A MAGNETIC RECORDING HEAD

FIELD OF THE INVENTION

The present invention relates to magnetic recording technology and more particularly to a method and system for providing a sputtered pole for a magnetic recording head.

BACKGROUND OF THE INVENTION

A conventional magnetic recording head includes a transducer deposited on a back surface of a slider. The slider also includes an air-bearing surface (ABS) that faces the recording media. FIG. 1 depicts a portion of conventional perpendicular magnetic recording (PMR) transducer 10 as viewed looking towards the ABS (not shown). The conventional PMR transducer 10 includes a conventional pole 16 and a top shield 24 separated by a write gap 20. Note that the top shield 24 also acts as pole during writing using the conventional PMR transducer 10. The conventional pole 16 and the top shield 24 are surrounded by insulating layers 18 and 22. The conventional pole 16 resides on a seed layer 12 and has sidewalls 14 and 15.

In conventional applications, the height of the conventional pole 16 is typically less than approximately three-tenths micrometer. The conventional pole 16 also has acute angles between horizontal and the sidewalls 14, 15 of the pole, such that the top of the conventional pole 16 is wider than the bottom of the conventional pole 16. Stated differently, each angle θ of the sidewalls 14, 15 is less than 90 degrees in the conventional pole 16 of FIG. 1. Generally, this angle, θ, is desired to be between five and fifteen degrees less than ninety degrees. A pole having this height and shape is desirable for use in PMR applications.

FIG. 2 depicts a conventional method 50 for forming the conventional PMR head 10. First, a seed layer 12 for the conventional pole 16 is deposited and the pattern for the conventional pole 16 formed, via steps 52 and 54, respectively. The material for the conventional pole 16 is then plated, via step 56. The remaining seed layer around the conventional pole 16 is removed, via step 58. The conventional pole 16 is then trimmed, via step 60. Consequently, the width of the conventional pole 16 and the negative angle are set in step 60. The insulator 18 is then deposited around the conventional pole 16, via step 62. A chemical mechanical planarization (CMP) is then performed to planarize the surface and expose the conventional pole 16, via step 64. The surface is then planarized in order to allow subsequent processing to be performed as desired. The write gap 20 is then provided, via step 66. The top shield 24 is then deposited and patterned in step 68. Finally, the region around the top shield 24 is insulated, via step 70.

Although the conventional method 50 can be used to form a conventional PMR head 10, the variation in the CMP process used in exposing the conventional pole 16 in step 64 has a relatively large vertical variation. For example, the three-sigma variation in the CMP may be on the order of three-tenths micrometer. Thus, the variation in the CMP process can be on the order of the height of the conventional pole 16. As a result, the height of the conventional pole 16 may be extremely difficult to control and fabrication of suitable conventional PMR heads 10 may be difficult to repeat. Manufacturing of conventional PMR heads 10 may, therefore, have an undesirably low yield.

Accordingly, what is needed is an improved, more repeatable method for fabricating a PMR head.

SUMMARY OF THE INVENTION

A method and system for manufacturing a pole on a recording head is disclosed. The method and system include sputtering at least one ferromagnetic layer and fabricating a hard mask on the ferromagnetic layer. The method and system also include defining the pole and depositing a write gap on the pole. A portion of the pole is encapsulated in an insulator.

DETAILED DESCRIPTION OF THE INVENTION

Figure 1:
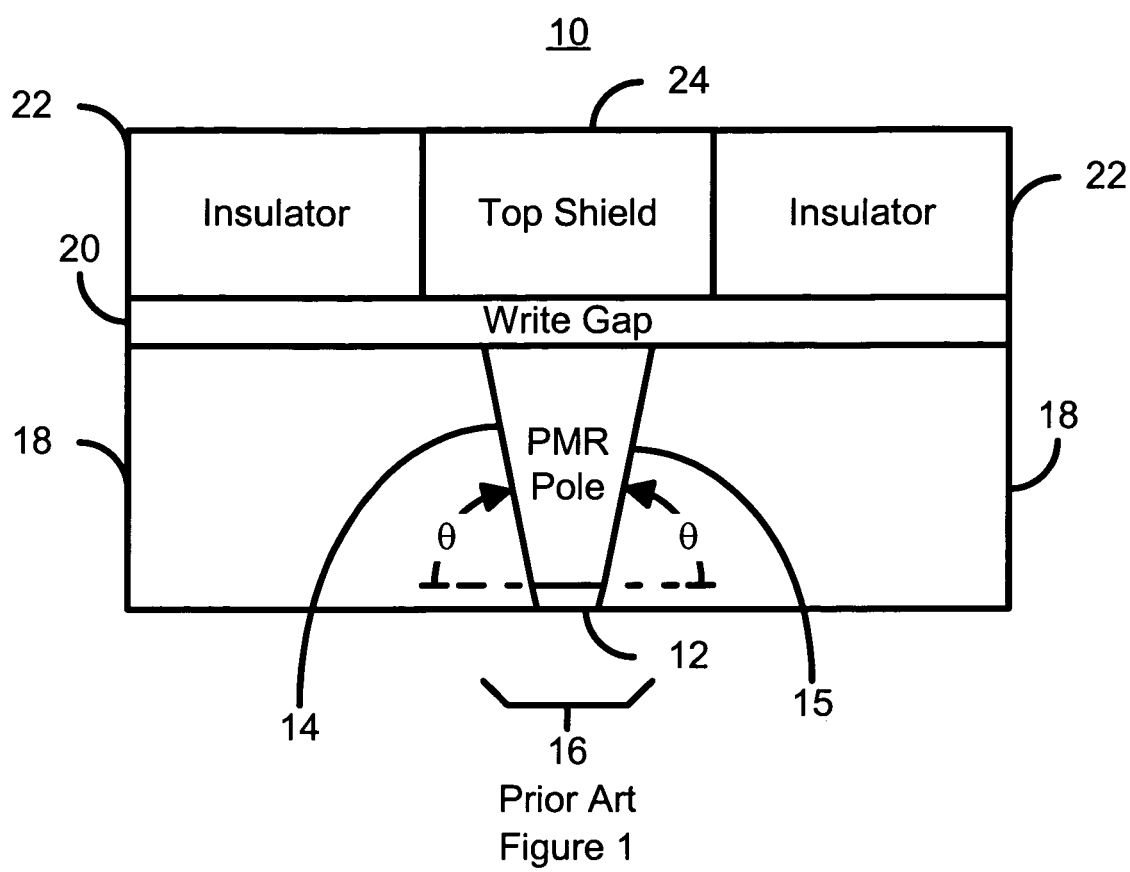
FIG. 1 is diagram depicting a conventional perpendicular magnetic recording pole.
Figure 2:
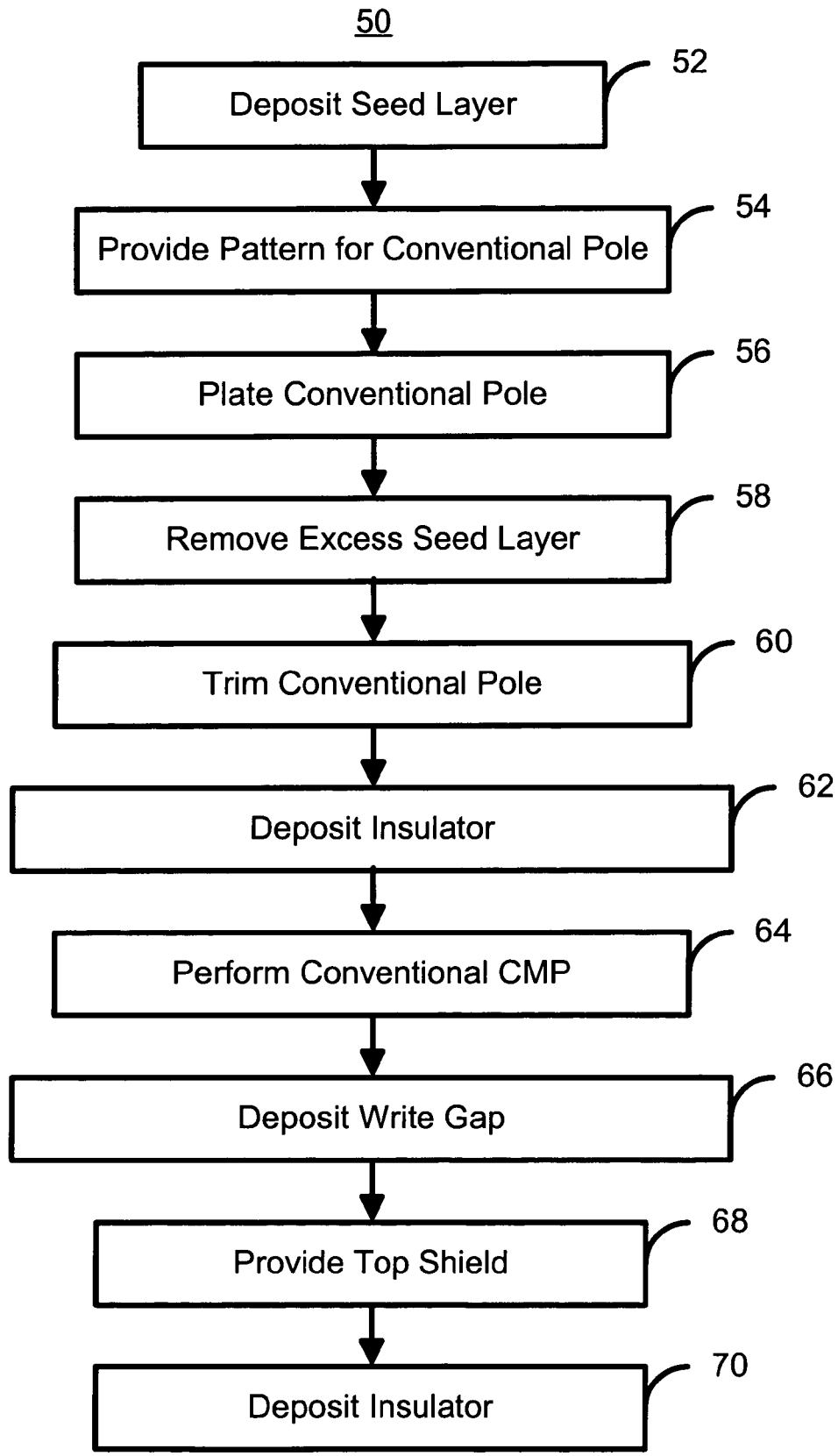
FIG. 2 is a flow chart depicting a conventional method for fabricating a perpendicular magnetic recording pole.
Figure 3A:
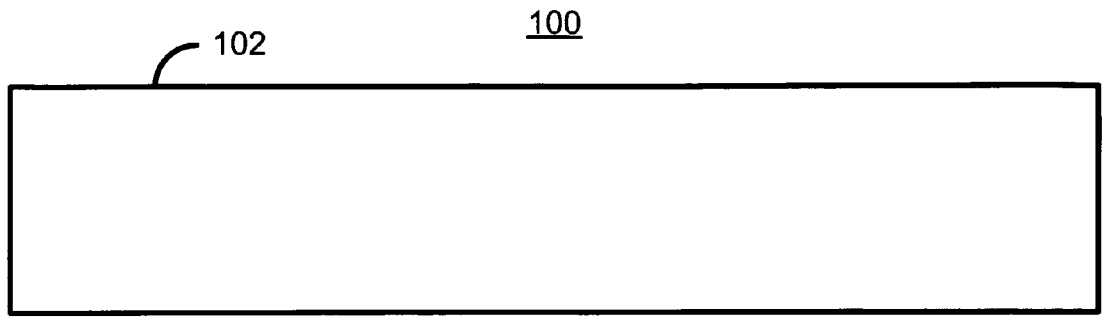
FIGS. 3A-3G depict a perpendicular magnetic recording head formed in accordance with an exemplary embodiment of the present invention.

FIGS. 3A-3G depict a PMR head 100 formed in accordance with an exemplary embodiment of the present invention. To enhance clarity, FIGS. 3A-3F are not drawn to scale. In addition, although a PMR head is depicted, the method and system may be used with a different head, such as a longitudinal recording head. FIG. 3A depicts the PMR head 100 after the material(s) 102 for the pole has been sputtered. The materials 102 could form a multilayer structure so that the resulting pole is a laminated structure. The material(s) 102 could also include alloys. The resulting pole is ferromagnetic, but in some embodiments, the material(s) 102 sputtered could include nonmagnetic materials as well as ferromagnetic materials. For example, the material(s) 102 may include CoFe, CoFeN, CoNiFe, CoFe/Ru, CoFe/Cr, as well as other materials.

Figure 3B:
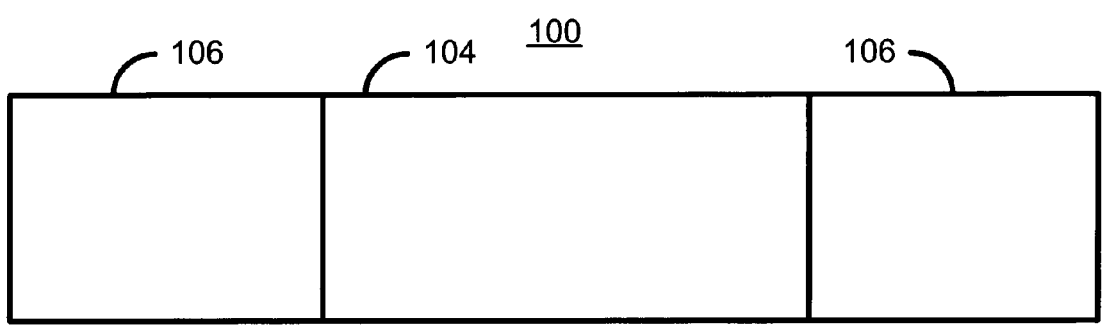

FIG. 3B depicts the PMR head 100 after a smaller region 104 of the ferromagnetic materials has been defined, for example by masking and ion milling a portion of the material(s) 102. The smaller region 104 is still wider than the pole which is being fabricated. For example, the width of the smaller region 104 may be two to one hundred microns and more preferably between ten and fifty microns. In addition, the regions previously occupied by the material(s) have been refilled with insulator 106. The insulator 106 is preferably alumina, but may be another insulator for example silicon oxide or silicon nitride.

Figure 3C:
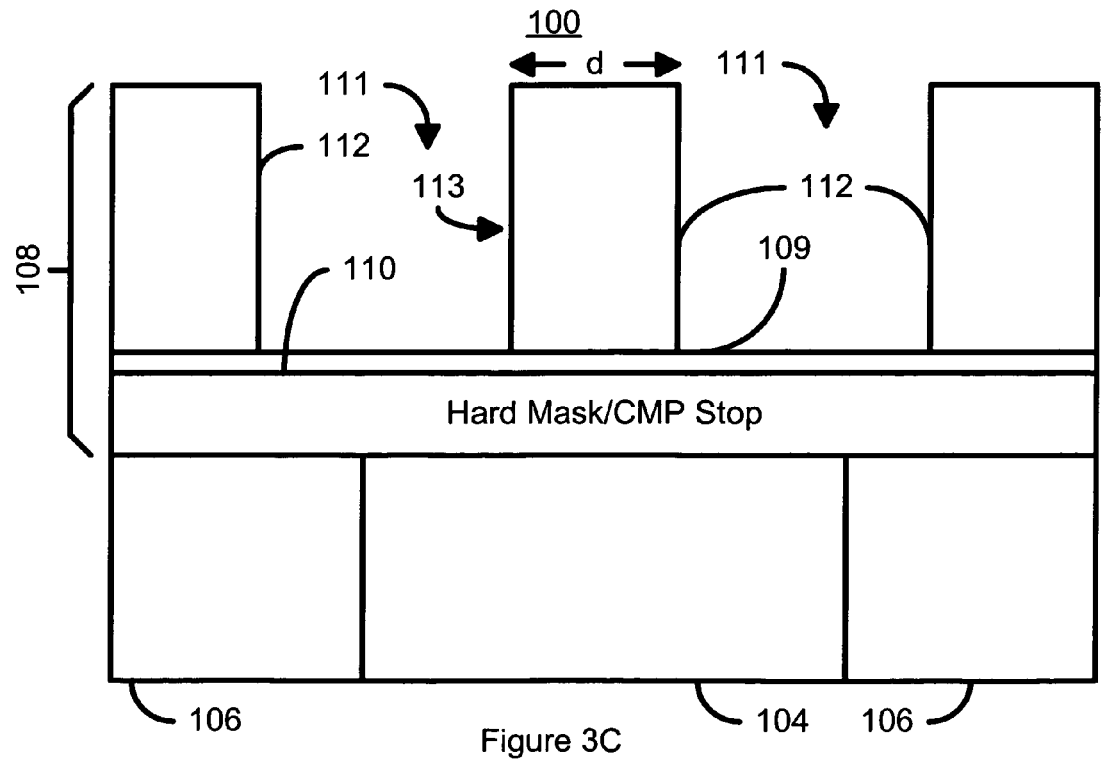

FIG. 3C depicts the PMR head 100 after formation of a hard mask 108, that in the embodiment of FIG. 3C includes a first hard mask layer 110 and an auxiliary mask layer 112. The first hard mask layer 110 has a lower milling rate than the underlying ferromagnetic material(s) of the region 104, and can thus be used to shadow the region 104 and obtain the desired trapezoidal shape of the pole, described below. The first hard mask layer 110 is preferably composed of diamond-like carbon (DLC), but could include other materials such as alumina, silicon nitride, and silicon dioxide. The first hard mask layer 110 may be a single layer or a multilayer structure, such as an aluminum oxide layer on a tantalum layer. DLC may be preferred for the first hard mask layer 110 because DLC be removed by an oxygen plasma ash if desired, has a lower removal rate under ion beam etching and can be patterned using photolithography relatively easily. In one embodiment, for DLC, the first hard mask layer 110 is at least one hundred Angstroms and not more than three thousand Angstroms in thickness. In another embodiment the DLC for the first hard mask layer 110 is between two hundred and one thousand five hundred Angstroms thick. In addition, in some embodiments, DLC might also be used as a chemical mechanical planarization (CMP) stop layer. In yet another embodiment, a CMP stop layer (not shown) such as Ta might be included under the first hard mask layer 110.

The auxiliary mask layer 112 can be patterned to form central region 113 and apertures 111. In one embodiment, the auxiliary mask layer 112 has a milling rate that is close to that of the ferromagnetic material(s) for the region 104. The auxiliary mask layer 112 is preferably composed of NiFe and formed on a seed layer 109. The central region 113 preferably has a dimension, d, that is close to the width of the pole being fabricated. The combination of the first hard mask layer 110 and the auxiliary mask layer 112 can be used to define the pole from the region 104 including ferromagnetic material(s). In a preferred embodiment, the hard mask 108 is used during an ion beam etch that defines the pole. In a preferred embodiment, the thick region 113 and the underlying portion of the first hard mask layer 110 are not etched through. Thus, the underlying region 104 including ferromagnetic material(s) is also etched, thus defining the pole.

Figure 3D:
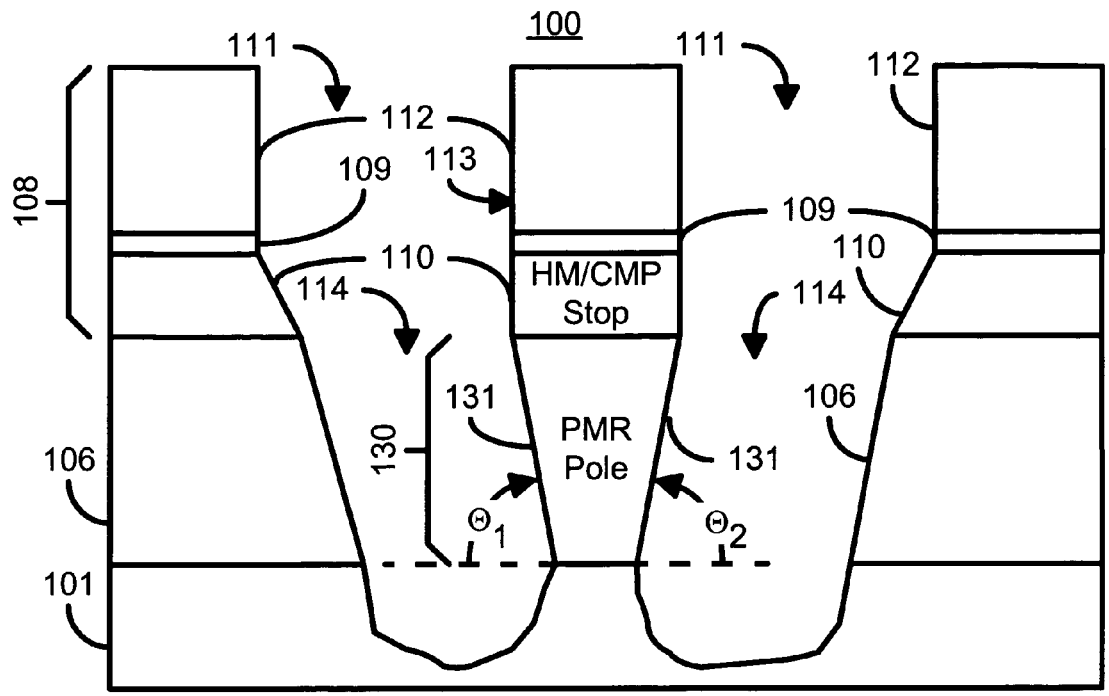

FIG. 3D depicts the PMR head 100 after the pole has been defined, preferably using ion beam etching. In the embodiment of FIG. 3D, because of the apertures 111 and the use of the first hard mask layer 110, the pole 130 has been defined from the region 104 of ferromagnetic material(s). In particular, the pole 130 has been defined to have a trapezoidal shape, with the top wider than the bottom. Stated differently, the sidewalls of pole 130 have angles, $\theta_1$ and $\theta_2$, with horizontal. These angles are preferably between seventy-five and eighty-five degrees (between five and ten degrees from vertical) and most preferably between seventy five and eighty degrees. In this embodiment, the width of the pole, w, is also slightly less than the diameter, d, of the thick region 113 of the auxiliary mask layer 112 prior to defining of the pole 130. In addition, trenches 114 have been created both in the insulating layer 106 and the underlying substrate 101.

Figure 3E:
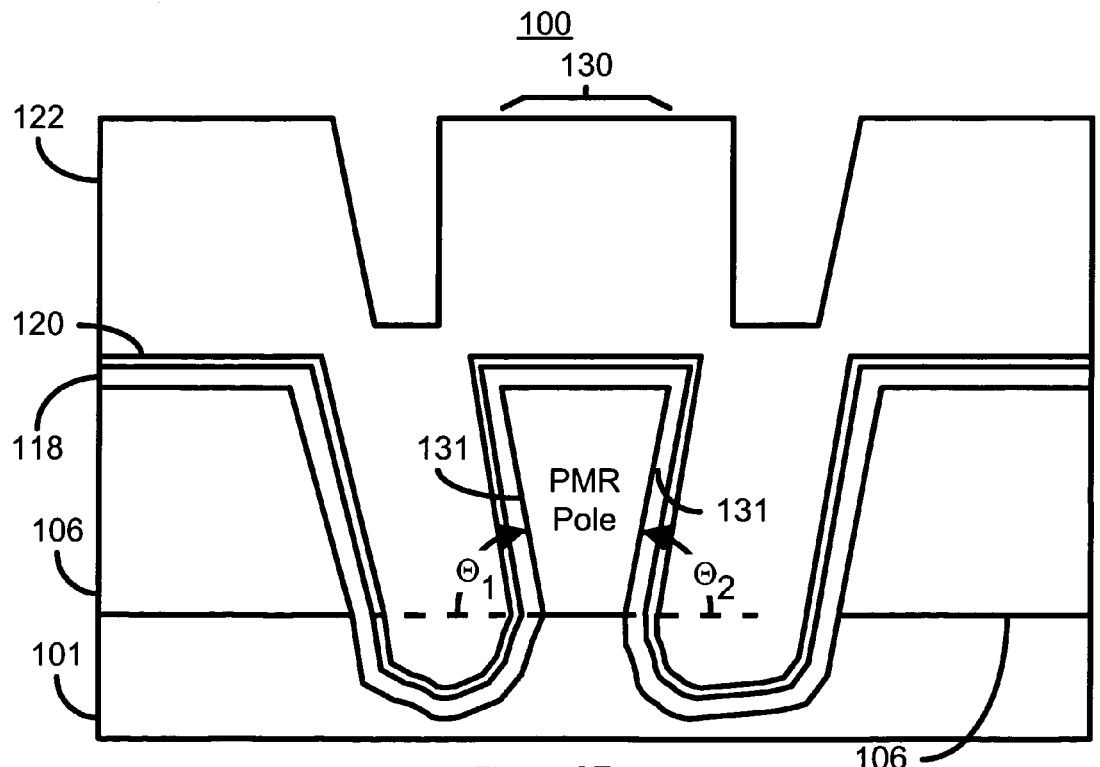

FIG. 3E depicts the PMR head 100 after further processing steps, which in this embodiment include removal of the hard mask 108, deposition of the write gap material 118 and a CMP stop layer 120, and refill using an insulator 122. Note that in another embodiment, described below, at least a portion of the hard mask 108 need not be removed. In such a case, the CMP stop layer 120 may be omitted. The write gap material is preferably insulating. The CMP stop layer 120 is preferably includes at least one of Ta, TaN, Ti, and TiN. In another embodiment, DLC might be used for the CMP stop layer 120. For Ta, the CMP stop layer 120 may have a thickness of between three hundred and one thousand Angstroms. In a preferred embodiment, the CMP stop layer 120 has a thickness of between three hundred to one thousand Angstroms. The insulator 122 preferably includes alumina and may have a thickness of approximately one-half to three microns. In a preferred embodiment, the insulator 122 includes 0.5-1.5 microns of alumina. However, in an alternate embodiment, another material, such as silicon oxide or silicon nitride, having another thickness may be used. In addition, because of the underlying topology, the top surface of the insulator 122 is not planar.

Figure 3F:
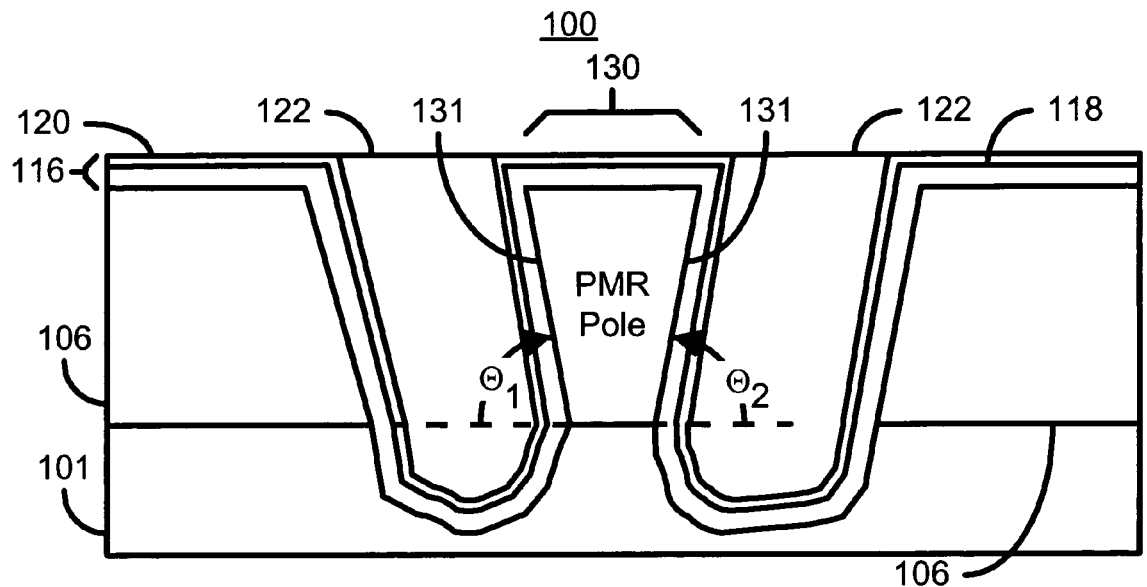

FIG. 3F depicts the PMR head 100 after the surface has been planarized, in this case by CMP. Because of the CMP, excess portions of the insulator 122 have been removed, leaving a relatively level top surface. In such an embodiment, the remaining portion of the CMP stop layer 120 is preferably part of the write gap. Thus, in such an embodiment, the write gap 116 is formed from the remaining portion of the CMP stop layer 120 and the write gap material 118. Because the CMP stop layer 120 is deposited over the write gap material 118, the thickness of the insulator 122 can be monitored in a nondestructive during the CMP. In addition, the uniformity of the CMP can be improved.

Figure 3G:
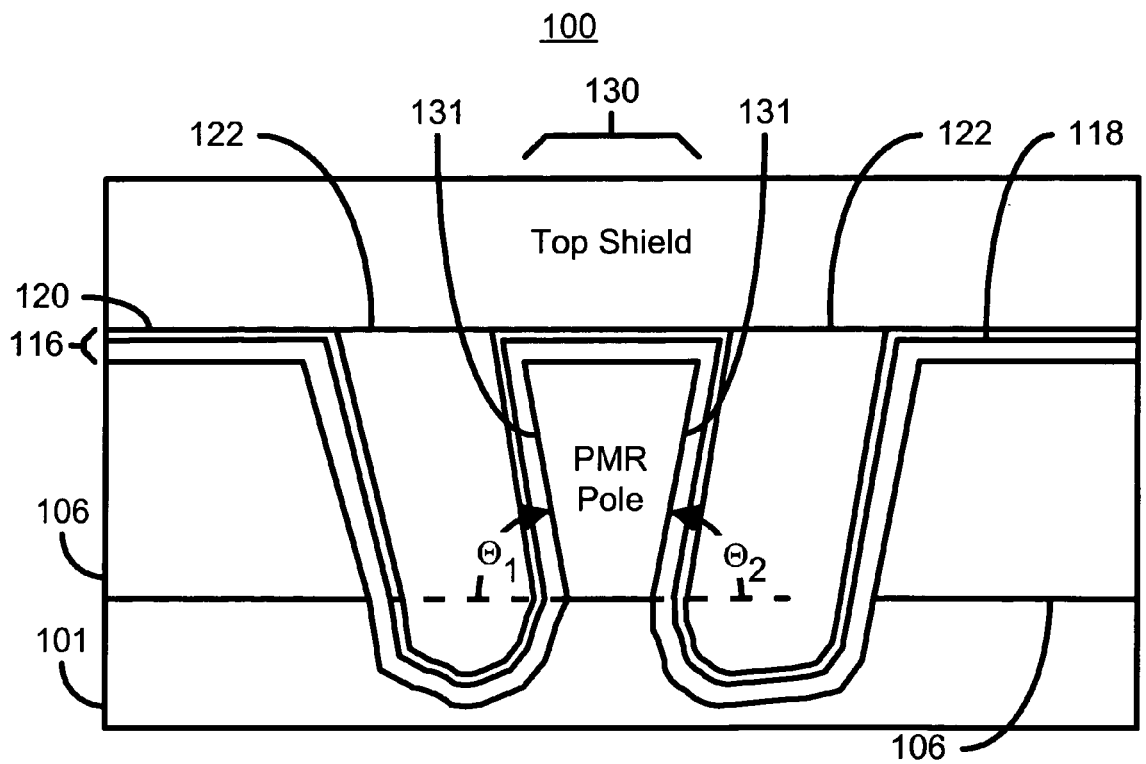

FIG. 3G depicts the PMR head 100 after formation of a top shield 140. In a preferred embodiment, the top shield 140 can be formed so that it is substantially flat.

Because of the use of the hard mask 108, the pole 130 that is sputtered and has the desired shape can be more easily formed. In addition, a variation in thickness can be reduced, in this case because the uniformity of the CMP can be improved. Consequently, a PMR head 100 having a pole 130 including sputtered material(s) can be more repeatably and more easily manufactured.

Figure 4A:
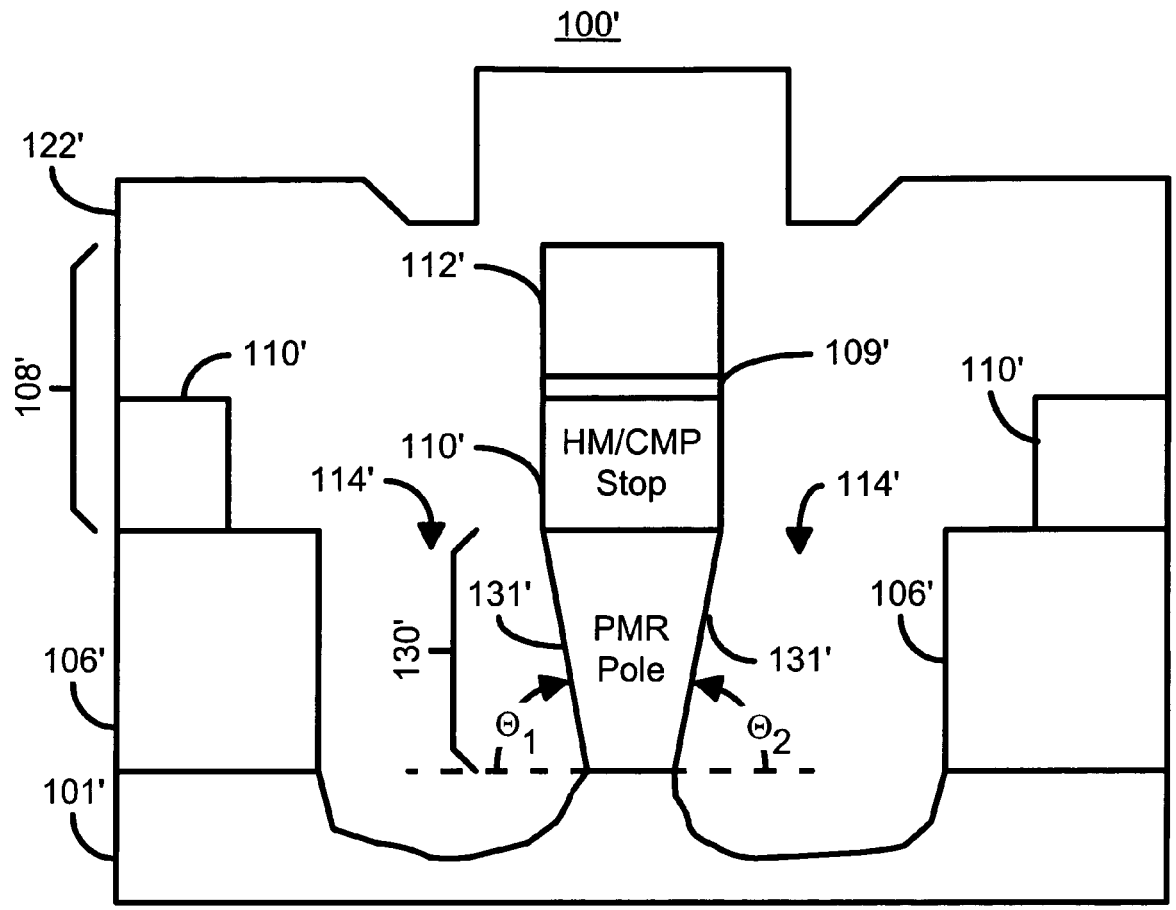
FIGS. 4A-4C depict a perpendicular magnetic recording head formed in accordance with a second exemplary embodiment of the present invention.
Figure 4B:
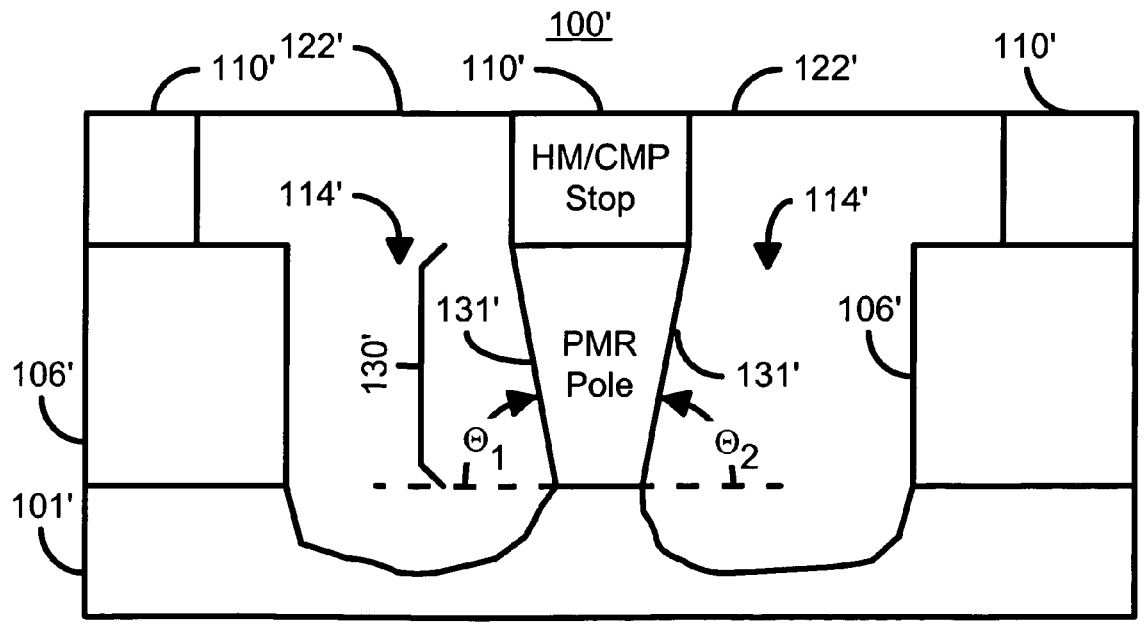
Figure 4C:
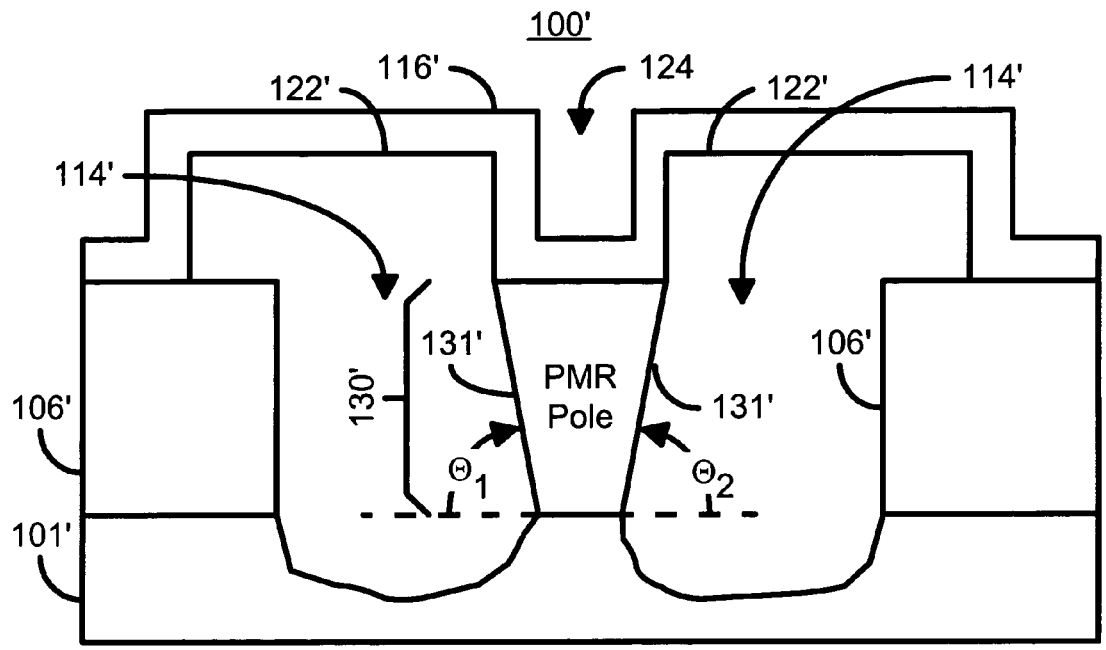

FIGS. 4A-4C depict a PMR head 100' formed in accordance with a second exemplary embodiment of the present invention. The initial steps of forming the PMR head 100' are the same as for the PMR head 100 shown in FIGS. 3A-3C. Components of the PMR head 100' are also analogous to the PMR head 100. Consequently, analogous portions are labeled similarly. In addition, to enhance clarity, FIGS. 4A-4C are not drawn to scale.

Referring to FIG. 4A, the pole 130' of the PMR head 100' has already been defined preferably using an ion beam etch. Thus, the pole 130', remaining portions of the hard mask 108' including the first mask layer 110', the seed layer 109', and the auxiliary mask layer 112' are depicted. In the embodiment shown, the hard mask 108' is configured to have a relatively small thickness of the first mask layer 110'. Consequently, the first mask layer 110' can preferably be used as a CMP stop layer. In a preferred embodiment, the first mask layer 110' is DLC and is at least one hundred Angstroms and not more than three thousand Angstroms in thickness. In another embodiment the DLC for the first hard mask layer 110 is between two hundred and one thousand five hundred Angstroms thick. The first mask layer 110', seed layer 109', and auxiliary mask layer 112' preferably have the same composition as described above. Consequently, the auxiliary mask layer 112' is preferably NiFe. Also shown is the insulator 122' used to encapsulate the pole 130'. However, as can be seen in FIG. 4A, the top of the insulator 122' is not planar due to the underlying topology. Consequently, a planarization step, in this case CMP, is performed.

FIG. 4B depicts the PMR head 100' after the CMP has been performed. Consequently, the excess portion of the insulator 122' has been removed and the top surface planarized. Because the first mask layer 110' is used as a CMP stop layer, a portion of the first mask layer 110', the remaining portion of the insulator 122' and the pole 130' remain.

FIG. 4C depicts the PMR head 100' after removal of the first hard mask layer 110' and deposition of a write gap 116'. Removal of the first hard mask layer 110' leaves a trench 124 in which the write gap 116' is deposited. In a preferred embodiment, the write gap 116' is deposited across the surface of the PMR head 100'. In addition, note that the write gap 116' preferably does not completely fill the trench 124 in this embodiment.

Because of the use of the hard mask 108', the sputtered pole 130' having the desired shape can be more easily formed. In addition, a variation in thickness can be reduced because in this embodiment the uniformity of the CMP can be improved. Moreover, because the first hard mask layer 110' is used as a CMP stop layer, processing can be simplified. Consequently, a PMR head 100' having a pole 130' including sputtered material(s) can be more repeatably and more easily manufactured.

Figure 5A:
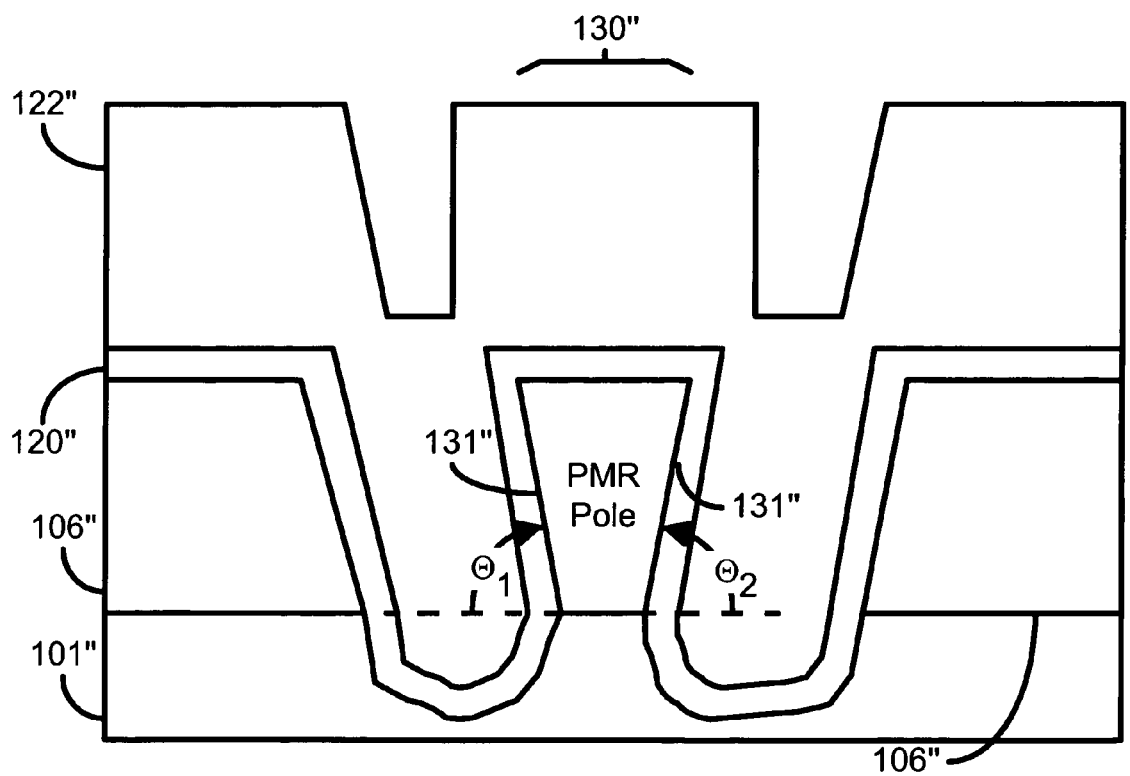
FIGS. 5A-5C depict a perpendicular magnetic recording head formed in accordance with a third exemplary embodiment of the present invention.
Figure 5B:
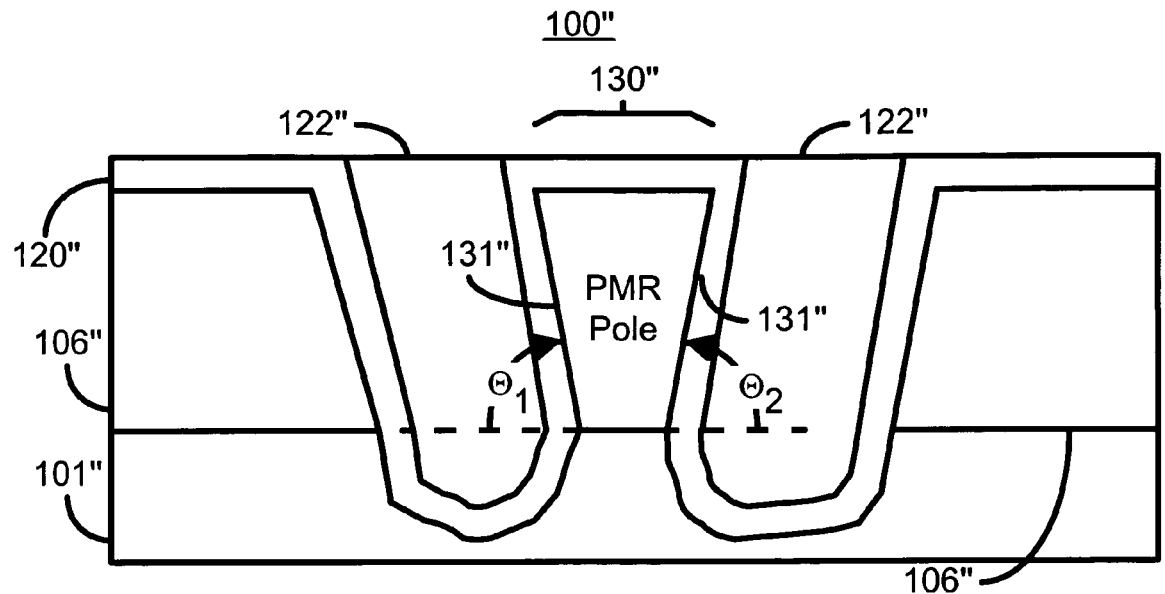
Figure 5C:
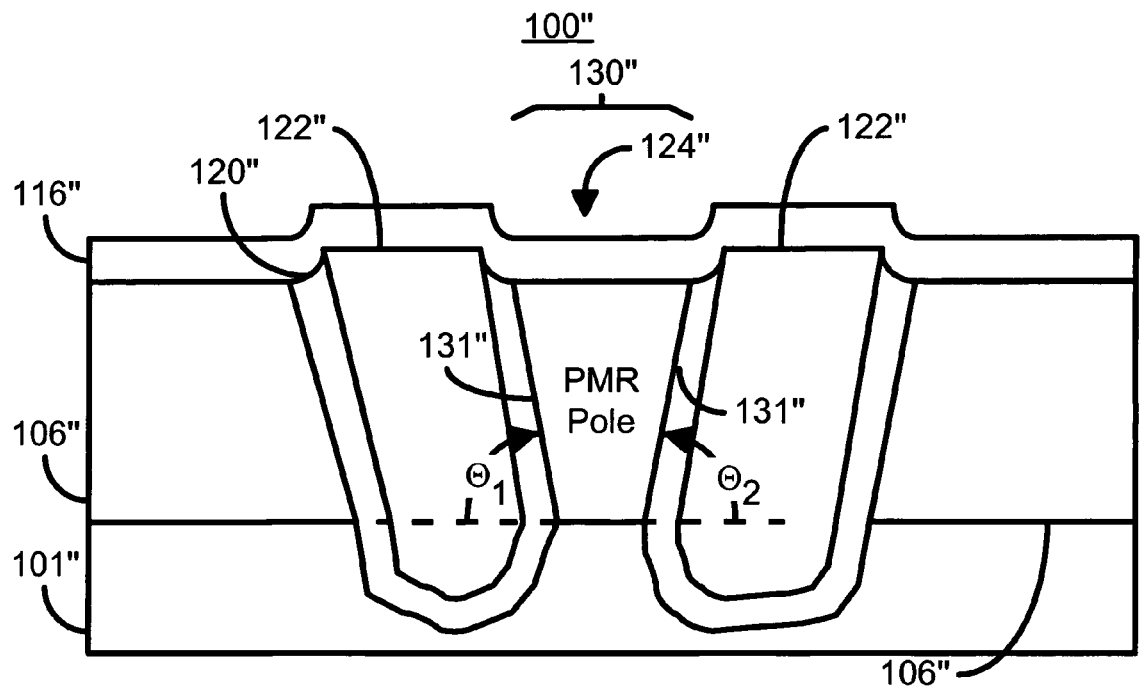

FIGS. 5A-5C depict a PMR head 100" formed in accordance with a third exemplary embodiment of the present invention. The initial steps of forming the PMR head 100" are the same as for the PMR head 100 shown in FIGS. 3A-3D. Components of the PMR head 100" are also analogous to the PMR head 100. Consequently, analogous portions are labeled similarly. In addition, to enhance clarity, FIGS. 5A-5C are not drawn to scale.

FIG. 5A depicts the PMR head 100" after the pole has been defined, preferably using ion beam etching and further processing steps have been performed. In particular, the hard mask 108 has been removed. In addition, a CMP stop layer 120" has been provided and refill using an insulator 122" has been performed. The CMP stop layer 120" is preferably includes at least one of Ta, TaN, Ti, and TiN. In another embodiment, DLC might be used for the CMP stop layer 120". For Ta, the CMP stop layer 120" may have a thickness of between three hundred and one thousand Angstroms. In a preferred embodiment, the CMP stop layer 120" has a thickness of between three hundred to one thousand Angstroms. The insulator 122" preferably includes alumina and may have a thickness of approximately one-half to three microns. In a preferred embodiment, the insulator 122 includes 0.5-1.5 microns of alumina. However, in an alternate embodiment, another material, such as silicon oxide or silicon nitride, having another thickness may be used. In addition, because of the underlying topology, the top surface of the insulator 122" is not planar.

FIG. 5B depicts the PMR head 100" after the CMP has been performed. Because of the CMP, excess portions of the insulator 122" have been removed, leaving a relatively level top surface.

FIG. 5C depicts the PMR head 100" after removal of the CMP stop layer 120" and deposition of a write gap 116". Removal of the CMP stop layer 120" leaves a small trench 124. The write gap 116" is deposited across the surface of the PMR head 100". The write gap 116' is composed of write gap material(s) and resides in the trench 124".

Because of the use of the hard mask 108", the sputtered pole 130" having the desired shape can be more easily formed. In addition, a variation in thickness can be reduced because, in this embodiment the uniformity of the CMP can be improved. Consequently, a PMR head 100" having a pole 130" including sputtered material(s) can be more repeatably and more easily manufactured.

Figure 6:
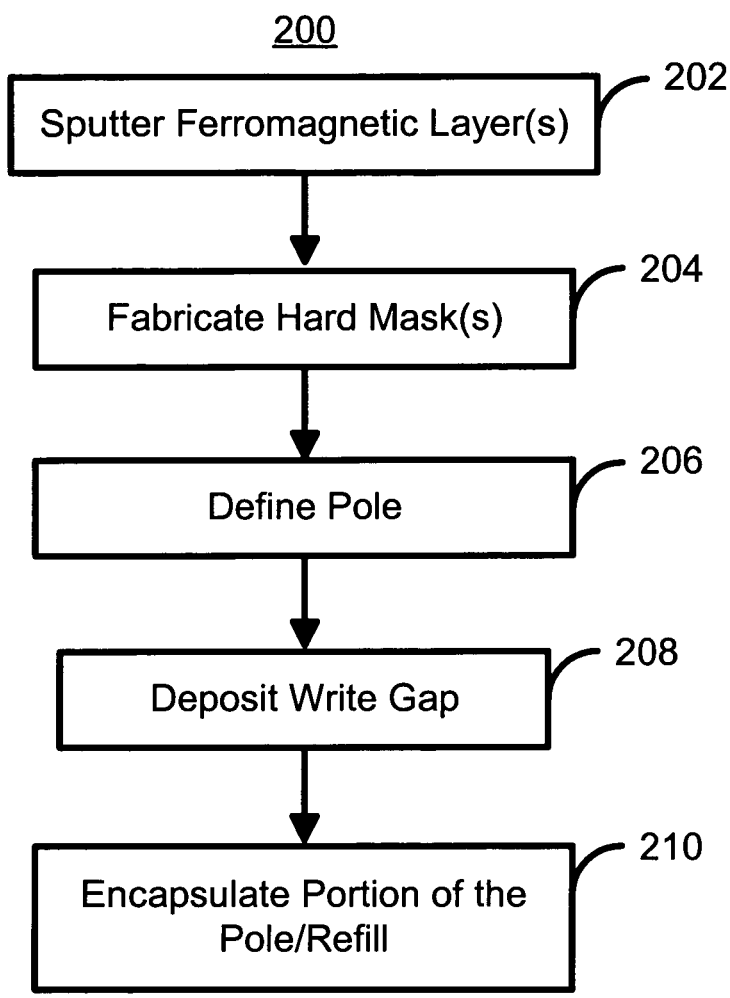
FIG. 6 is a flow chart depicting a method in accordance with an embodiment of the present invention.

FIG. 6 is a flow chart depicting a method 200 in accordance with an embodiment of the present invention. The method 200 is described in the context of forming a single PMR head 100. However, typically multiple PMR heads 100 or 100' are fabricated simultaneously on a substrate. One of ordinary skill in the art will recognize that other and/or additional steps, as well as performing the steps in another order not inconsistent with the present invention may be included in the method 200. Further, for clarity, the method 200 is described in the context of PMR head 100. However, the method 200 may be used with another head (not shown), including longitudinal heads.

In the embodiment of FIG. 6, at least one ferromagnetic layer 102 is sputtered, via step 202. The ferromagnetic layer(s) may include ferromagnetic alloys, multilayers including ferromagnetic and nonmagnetic materials, ferrimagnetic or other magnetic materials. In the embodiment of FIG. 6, a hard mask 108 is fabricated on the ferromagnetic layer(s), via step 204. In a preferred embodiment, step 204 includes depositing a first hard mask layer 110 that can shadow the underlying ferromagnetic layer(s) 102 to form a negative angle. Step 204 also preferably includes depositing an auxiliary mask layer 112 and any seed layer(s) 109 and patterning the auxiliary mask layer 112. In the embodiment of FIG. 6, the pole is defined using the hard mask 108 as a mask, via step 206. Thus, the pole 130 having negative angles $\theta_1$ and $\theta_2$ is provided. A write gap is deposited, via step 208. In the embodiment of FIG. 6, the pole 130 is encapsulated in insulator 122, via step 210. In one embodiment, any remaining portion of the hard mask 108 is removed prior to the encapsulation in step 210. In such an embodiment, the use of DLC that can be relatively easily removed using an oxygen ashing process is preferred. Also in such an embodiment, a write gap layer 118 and a CMP stop layer 120 are preferably provided. In another embodiment, particularly where the first hard mask 110 is sufficiently thin, the DLC need not be removed. Instead, a portion the DLC may remain as a CMP stop layer. Processing of the head, for example forming a shield or other structures, may then be completed.

Thus, the PMR head 100, 100', or 100" may be fabricated by a method 200 which allows the fabrication of a sputtered pole 130, 130', or 130". Furthermore, use of DLC in the formation of the hard mask in step 204 can simplify the method by easing the removal of the first hard mask 110, allowing a pattern to be more easily transferred to the first hard mask 110, and allowing the desired shape of the pole 130 to be obtained. In addition, the write gap formation may be better controlled. Further, the CMP can be more easily controlled by measuring the thickness of the insulator 122, 122', or 122". Such CMP may also result in a lower variation (e.g. with a three sigma of less than 0.1 µm). Moreover, the method 200 can be used as part of a process that forms a top shield that is substantially flat.

Figure 7:
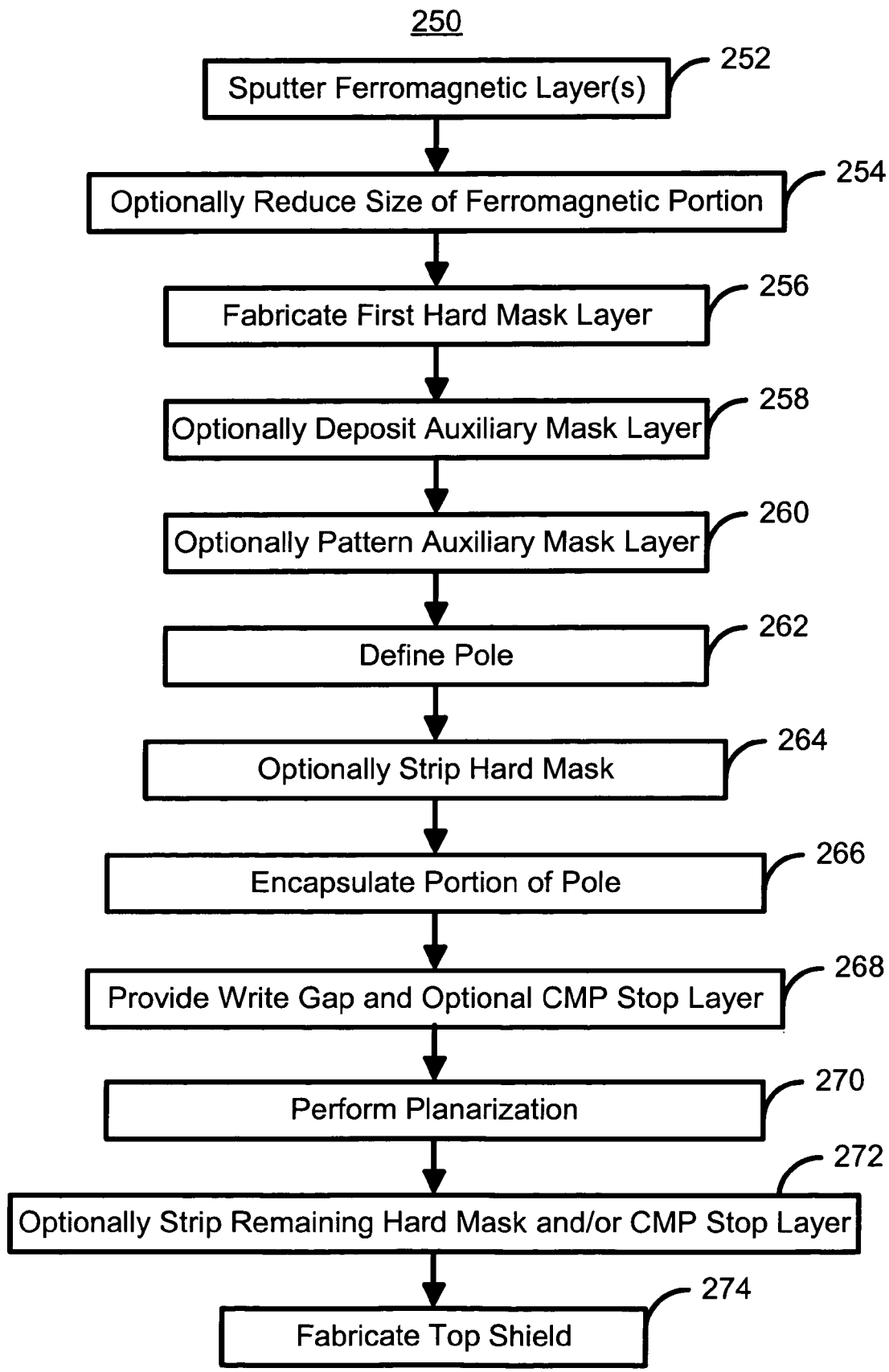
FIG. 7 is another flow chart depicting a method for providing a perpendicular magnetic recording head in accordance with an exemplary embodiment of the present invention.

FIG. 7 is a flow chart depicting a method 250 for providing a PMR head in accordance with an exemplary embodiment of the present invention. The method 250 is described in the context of forming a single PMR head 100. However, typically multiple PMR heads 100, 100', or 100" are fabricated simultaneously on a substrate. One of ordinary skill in the art will recognize that other steps, additional steps, fewer steps, or steps performed in a different order, not inconsistent with the present invention may be included in the method 250. Although the method 250 is described in the context of PMR head 100, it may be used with other types of heads (not shown), including longitudinal heads.

In the embodiment of FIG. 7, at least one ferromagnetic layer 102 is sputtered, via step 252. The ferromagnetic layer(s) may include ferromagnetic alloys, multilayers including ferromagnetic and nonmagnetic materials, ferrimagnetic or other magnetic materials. The ferromagnetic layer(s) may optionally be reduced in size to a smaller region 104, via step 254. A first hard mask layer 110 can be fabricated on the ferromagnetic layer(s), via step 256. In the embodiment of FIG. 7, the auxiliary mask layer 112 is also optionally deposited on the first hard mask layer, via step 258.

Step 258 may also include providing any layers, such as seed layer 109, for the auxiliary mask layer 112. In the embodiment of FIG. 7, the auxiliary mask layer is optionally patterned, via step 260. Thus, the hard mask 108 can be formed in steps 256, 258, and 260. The pole 130 can be defined using a hard mask 108, via step 262. Thus, the pole 130 having negative angles $\theta_1$ and $\theta_2$ can be provided. The remaining portion(s) of the hard mask 108 is optionally stripped, via step 264. Step 264 is preferably used for the PMR head 100, but is preferably omitted for the PMR head 100'. In such an embodiment, the use of DLC (that can be relatively easily removed using an oxygen ashing process) is preferred. The pole 130 can be encapsulated in insulator 122, via step 266. In the embodiment of FIG. 7, a write gap layer 118 and, optionally, a CMP stop layer 120 are provided, via step 268. The CMP stop layer 120 is preferably used in fabricating the PMR head 100, but is omitted for the PMR head 100'. In the embodiment of FIG. 7, a planarization step is performed, via step 270. Preferably step 270 includes performing a CMP step. In one embodiment, step 270 is performed after step 268. However, in an alternate embodiment, for example for the PMR head 100', the CMP is performed in step 268 prior to formation of the write gap. Any remaining hard mask 108 and/or CMP stop layer 120 is optionally stripped, via step 272. If the PMR head 100' is being fabricated, then step 268 is performed after step 272. A shield is fabricated, via step 274. Step 274 might include depositing the shield or depositing a seed layer followed by plating the shield. Fabrication of the PMR head 100' may then be completed.

The PMR head 100, 100', or 100" may be fabricated by a method 250 which allows the fabrication of a sputtered pole 130, 130', or 130". Furthermore, use of DLC in the formation of the hard mask can simplify the method by easing the removal of the first hard mask 110, allowing a pattern to be more easily transferred to the first hard mask 110, and allowing the desired shape of the pole 130 to be obtained. In addition, the write gap formation can be better controlled. Further, the CMP can be more easily controlled by measuring the thickness of the insulator 122, 122', or 122'. Such CMP may also result in a lower variation (e.g. with a three sigma of less than 0.1 μm).

We claim:

1. A method for manufacturing a pole for a magnetic recording head comprising:
    sputtering at least one ferromagnetic layer;
    fabricating a hard mask on the at least one ferromagnetic layer, the hard mask including at least one hard mask layer and at least one auxiliary mask layer on the at least one hard mask layer;
    defining the pole using a removal process for removing a portion of the at least one ferromagnetic layer, the at least one ferromagnetic layer having a first removal rate for the removal process, the at least one hard mask layer having a second removal rate for the removal process, and the at least one auxiliary mask layer having a third removal rate for the removal process, the first removal rate and the third removal rate being greater than the second removal rate;
    depositing a write gap on the pole; and
    encapsulating a portion of the pole in an insulator.

2. The method of claim 1 wherein the fabricating further includes:
    depositing a hard mask layer; and
    patterning the hard mask layer to form the hard mask.

3. The method of claim 1 wherein the pole defining further includes:
    trimming the pole using the hard mask to provide a desired profile of the pole.

4. The method of claim 3 wherein the desired profile is a trapezoid.

5. The method of claim 1 wherein the pole is a perpendicular magnetic recording pole.

6. The method of claim 1 wherein the pole is a longitudinal magnetic recording pole.

7. The method of claim 1 further comprising:
    performing a chemical mechanical planarization of at least the insulator.

8. The method of claim 7 wherein the performing step further includes:
    utilizing a portion of the hard mask as a stop layer for the chemical mechanical planarization.

9. The method of claim 7 further comprising:
    providing a chemical mechanical planarization stop layer on the write gap.

10. The method of claim 1 further comprising:
    removing the hard mask after the encapsulating step.

11. The method of claim 10 further comprising:
    performing a chemical mechanical planarization after the hard mask is removed.

12. The method of claim 1 further comprising:
    fabricating a substantially flat shield on at least the write gap.

13. The method of claim 1 wherein the first removal rate is substantially the same as the third removal rate.

14. The method of claim 13 wherein the at least one auxiliary mask layer includes NiFe.

* * * * *